(12) United States Patent
Nishikawa

(10) Patent No.: US 9,110,620 B2
(45) Date of Patent: Aug. 18, 2015

(54) PRINTING APPARATUS INCLUDING DOWNLOAD PRINTING PROCEDURE

(71) Applicant: BROTHER KOGYO KABUSHIKI KAISHA, Nagoya-shi, Aichi-ken (JP)

(72) Inventor: Naoki Nishikawa, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/258,123

(22) Filed: Apr. 22, 2014

(65) Prior Publication Data

US 2014/0313548 A1  Oct. 23, 2014

(30) Foreign Application Priority Data

Apr. 23, 2013 (JP) .................................. 2013-090038
Feb. 6, 2014 (JP) .................................. 2014-021467

(51) Int. Cl.
*G06F 3/12* (2006.01)

(52) U.S. Cl.
CPC ............ *G06F 3/1285* (2013.01); *G06F 3/1268* (2013.01)

(58) Field of Classification Search
None
See application file for complete search history.

(56) References Cited

U.S. PATENT DOCUMENTS

| 8,823,982 B2* | 9/2014 | Cook ........................... 358/1.15 |
| 2007/0081186 A1 | 4/2007 | Numata | |
| 2012/0224211 A1* | 9/2012 | Ferlitsch et al. ............. 358/1.13 |

FOREIGN PATENT DOCUMENTS

| JP | 2007-105937 A | 4/2007 |
| JP | 2009-152952 A | 7/2009 |
| JP | 2013-001059 A | 1/2013 |

* cited by examiner

*Primary Examiner* — Thomas D Lee
(74) *Attorney, Agent, or Firm* — Scully, Scott, Murphy & Presser, P.C.

(57) ABSTRACT

A processor performs: receiving a print instruction including a designation of particular image data stored in a server; in response to reception of the print instruction, acquiring at least one of a property of the particular image data, a print setting of the particular image data, and a state of a printing apparatus; and based on the at least one, determining one of first and second processing modes; when the first processing mode is determined, receiving the particular image data until reaching a first unit of data; and controlling a printing device to print the particular image data of the first unit; and when the second processing mode is determined, receiving the particular image data until reaching a second unit of data; and controlling the printing device to print the particular image data of the second unit. The second unit of data is larger than the first unit of data.

20 Claims, 7 Drawing Sheets

PRINTING APPARATUS INCLUDING DOWNLOAD PRINTING PROCEDURE

CROSS REFERENCE TO RELATED APPLICATIONS

This application claims priority from Japanese Patent Application No. 2013-090038 filed Apr. 23, 2013 and Japanese Patent Application No. 2014-021467 filed Feb. 6, 2014. The entire content of each of the priority applications is incorporated herein by reference.

TECHNICAL FIELD

The invention relates to a printing apparatus and the like.

BACKGROUND

Conventionally, in a printing system having a printing apparatus and a server, technology is known that a download request of image data is outputted from a printing apparatus to a server, the image data is downloaded from the server, and the printing apparatus performs printing based on the image data. Hereinafter, printing in accordance with the above-described procedure will be referred to as "download printing".

In technology relating to the download printing, for example, print jobs are preliminarily stored in a server, a user selects, through an operation panel of a printing apparatus, a print job to be printed from among the print jobs stored in the server, and the selected print job is downloaded to the printing apparatus and is printed.

SUMMARY

In the above-described technology, however, a printing process is executed after downloading of image data of the selected print job is completed. That is, timing of starting the printing process is always the same. However, it is sometimes preferable that timing of starting the printing process be not the same. Hence, there is a room for improvement.

In view of the foregoing, according to one aspect, the invention provides a printing apparatus. The printing apparatus includes an interface, a printing device configured to perform printing based on image data, a processor, and a memory storing instructions. When executed by the processor, the instructions cause the processor to perform: receiving a print instruction via the interface, the print instruction including a designation of particular image data stored in a server; in response to reception of the print instruction, acquiring at least one of a property of the particular image data, a print setting of the particular image data, and a state of the printing apparatus; and based on the at least one of the property, the print setting, and the state, determining one of a first processing mode and a second processing mode; when the first processing mode is determined, receiving the particular image data until reaching a first unit of data; and controlling the printing device to print the particular image data of the first unit; and when the second processing mode is determined, receiving the particular image data until reaching a second unit of data; and controlling the printing device to print the particular image data of the second unit. The second unit of data is larger than the first unit of data.

According to another aspect, the invention also provides a method of printing image data with a printing apparatus having a printing device. The method includes: receiving a print instruction via an interface, the print instruction including a designation of particular image data stored in a server; in response to reception of the print instruction, acquiring at least one of a property of the particular image data, a print setting of the particular image data, and a state of the printing apparatus; and based on the at least one of the property, the print setting, and the state, determining one of a first processing mode and a second processing mode; when the first processing mode is determined, receiving the particular image data until reaching a first unit of data; and controlling the printing device to print the particular image data of the first unit; and when the second processing mode is determined, receiving the particular image data until reaching a second unit of data; and controlling the printing device to print the particular image data of the second unit. The second unit of data is larger than the first unit of data.

According to still another aspect, the invention also provides a non-transitory computer-readable storage medium storing computer-readable instructions executable by a processor of a printing apparatus including an interface and a printing device configured to perform printing based on image data. When executed by the processor, the computer-readable instructions cause the processor to perform: receiving a print instruction via the interface, the print instruction including a designation of particular image data stored in a server; in response to reception of the print instruction, acquiring at least one of a property of the particular image data, a print setting of the particular image data, and a state of the printing apparatus; and based on the at least one of the property, the print setting, and the state, determining one of a first processing mode and a second processing mode; when the first processing mode is determined, receiving the particular image data until reaching a first unit of data; and controlling the printing device to print the particular image data of the first unit; and when the second processing mode is determined, receiving the particular image data until reaching a second unit of data; and controlling the printing device to print the particular image data of the second unit. The second unit of data is larger than the first unit of data.

BRIEF DESCRIPTION OF THE DRAWINGS

Embodiments in accordance with the invention will be described in detail with reference to the following figures wherein.

DETAILED DESCRIPTION

A printing apparatus according to an embodiment of the invention will be described while referring to the accompanying drawings. In the present embodiment, the invention is applied to a multifunction peripheral (MFP) having an image forming function.

Figure 1:
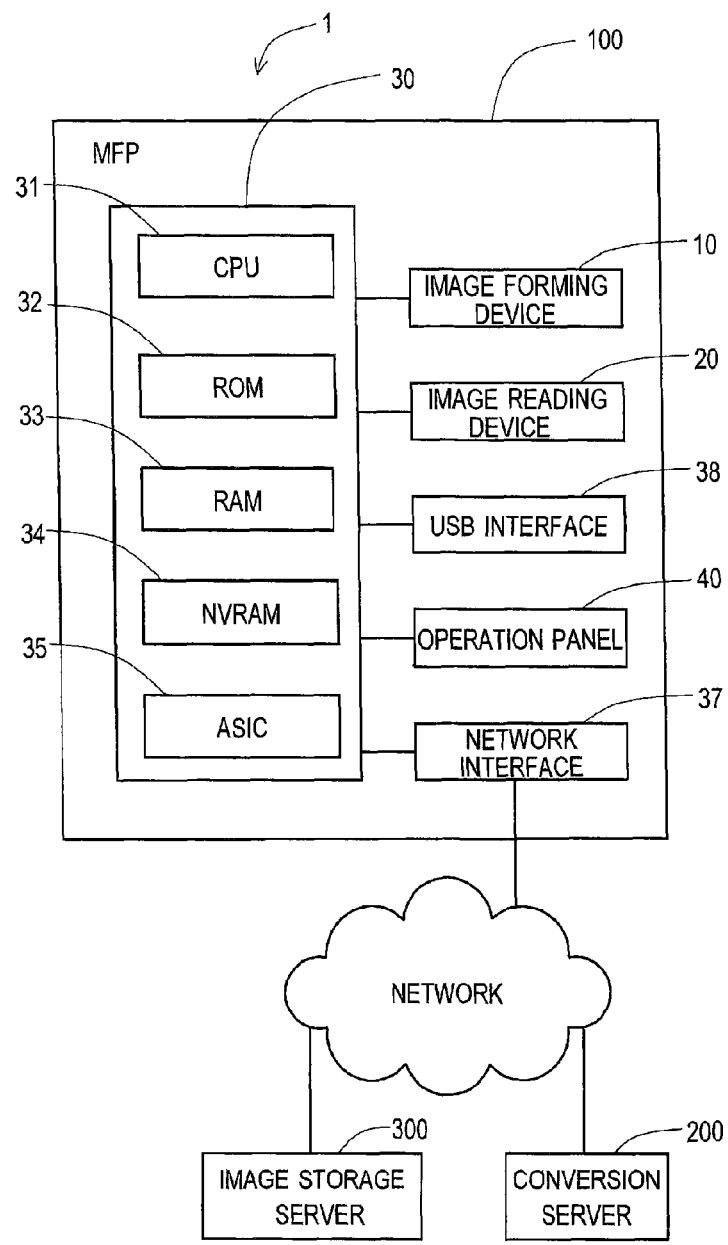
FIG. 1 is a block diagram showing a printing system according to an embodiment.

As shown in FIG. 1, a printing system 1 of the present embodiment includes an MFP 100, a conversion server 200, and an image storage server 300, which can communicate with each other through a network such as Internet. The MFP 100 is an example of a printing apparatus. The conversion server 200 is an example of an external device that performs a conversion process. The image storage server 300 is an example of a server. A combination of the MFP 100 and the conversion server 200 is an example of a printing system.

The MFP 100 has a function of receiving, through the network, image data stored in the image storage server 300, and of performing printing based on the received image data. This printing is download printing. Upon receiving an instruction for download printing, the MFP 100 transmits a request to the image storage server 300. The request is for transmission of the image data to the MFP 100. Note that the MFP 100 can also receive image data with a print command from a PC or the like and perform printing.

The conversion server 200 is a computer having a device driver for the MFP 100. The conversion server 200 has a function of converting image data of various formats stored in the image storage server 300 into data of a format that can be analyzed by the MFP 100. Note that the conversion server 200 may be realized by a single computer, a plurality of computers, a cloud system, or the like.

The image storage server 300 stores various image data, and supplies stored image data through the network such as Internet. The image storage server 300 may be realized by a single computer, a plurality of computers, a cloud system, or the like. By instructing the MFP 100 to perform download printing, a user can select a desired image data from among image data stored in the image storage server 300, and request printing at the MFP 100. Hereinafter, receiving image data stored in the image storage server 300 through the network is referred to as "downloading".

The MFP 100 may download image data directly from the image storage server 300, or may download image data via an external device such as the conversion server 200. For example, if the MFP 100 cannot analyze downloaded image data by itself, the MFP 100 transmits the image data to the conversion server 200 which converts the image data into analyzable image data. Further, for example, at the time of downloading image data stored in the image storage server 300, the MFP 100 downloads the image data via the conversion server 200, thereby downloading converted image data.

Note that image data stored in the image storage server 300 include data of various file formats. For example, the image data include PDF data, TIFF data, JPEG data, and the like. The image data also include text data and data specific to a certain application. The MFP 100 is capable of analyzing PDL data that has been converted by a device driver for the MFP 100 itself, postscript data, and so on. On the other hand, many of data of various file formats described above cannot be analyzed by the MFP 100. Hence, if image data for which download printing is instructed by the MFP 100 is data that cannot be analyzed by the MFP 100, a conversion process by the conversion server 200 is needed for performing printing appropriately. Examples of the conversion process are a PDL (page description language) conversion process and a RIP (raster image processor) process.

Next, the electrical configuration of the MFP 100 will be described. As shown in FIG. 1, the MFP 100 has a main controller 30 including a CPU 31, a ROM 32, a RAM 33, an NVRAM (nonvolatile RAM) 34, and an ASIC 35. The MFP 100 also has an image forming device 10, an image reading device 20, a network interface 37, a USB interface 38, and an operation panel 40, which are electrically connected to the main controller 30.

The image forming device 10 is for printing an image on a sheet of paper. In the MFP 100 of the present embodiment, the image forming device 10 is a page printer of an electrophotographic type. The image forming device 10 may be capable of forming a color image, or may be capable of forming only a monochromatic image. The image forming device 10 is an example of a printing device. The image reading device 20 is for reading (scanning) an image on an original document. The reading mechanism may be CCD or CIS. The image reading device 20 may be capable of reading a color image, or may be capable of reading only a monochromatic image.

The ROM 32 stores various control programs for controlling the MFP 100, various settings, default values, and the like. The RAM 33 is used as work areas to which various control programs are read out, or as storage areas in which data is stored temporarily.

The CPU 31 controls each element of the MFP 100, while storing the processing results in the RAM 33 and the NVRAM 34 based on the control programs read out from the ROM 32. The CPU 31 is an example of a processor. Here, the main controller 30 may be a processor, or the ASIC 35 may be a processor. Note that the main controller 30 in FIG. 1 is a collective term including hardware used for controlling the MFP 100, such as the CPU 31. Thus, the main controller 30 does not necessarily mean a single hardware that is actually provided in the MFP 100.

The network interface 37 is hardware for performing communication with the network through a LAN cable or the like. The USB interface 38 is hardware for performing communication with an apparatus connected through a USB cable or the like. The network interface 37 and the USB interface 38 are an example of a data receiver. The operation panel 40 includes a liquid crystal display and a button group having a start key, a stop key, ten keys, and the like, for receiving an instruction input by a user.

Figure 2:
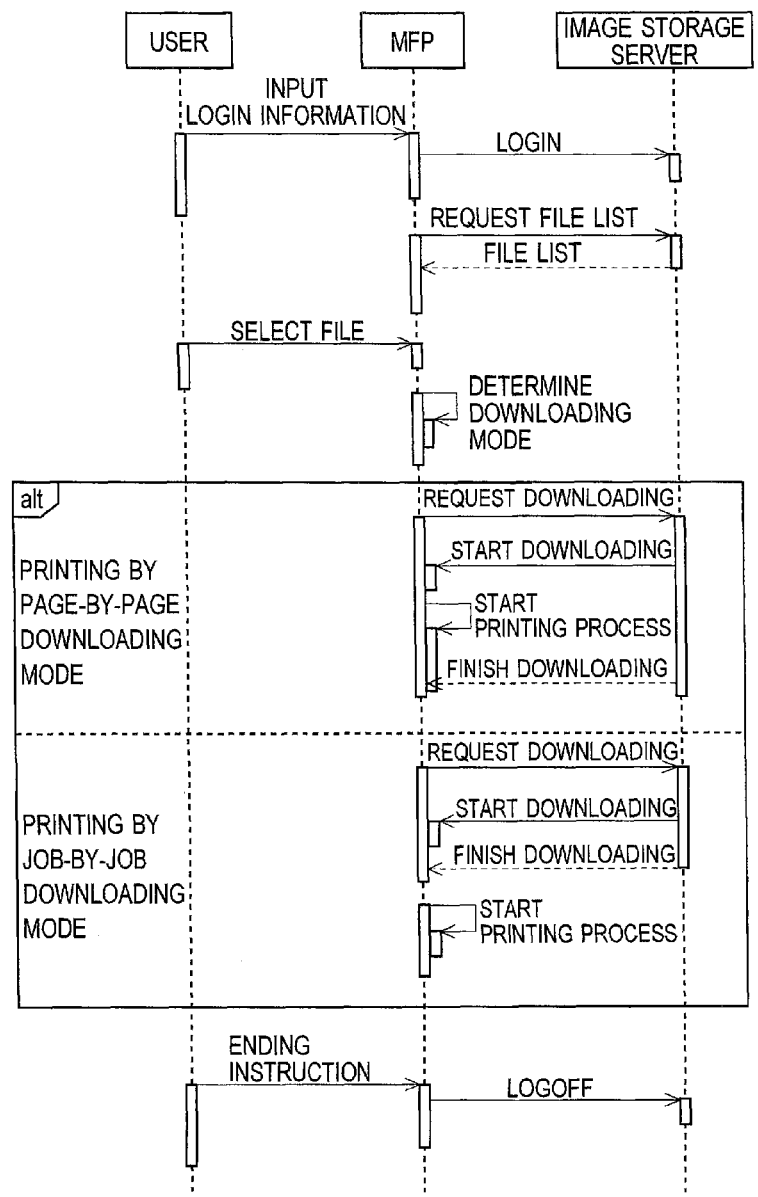
FIG. 2 is a sequence chart showing the procedure of download printing.

Next, the procedure of download printing executed by the MFP 100 will be described while referring to the sequence chart of FIG. 2. In this chart, the operations of each of the user, the MFP 100, and the image storage server 300 are shown in the sequence of execution from the upper side to the lower side along the vertical dashed lines. The central dashed line shows the operations of the MFP 100, the left-side dashed line shows the operations of the user, and the right-side dashed line shows the operations of the image storage server 300. Further, the lateral arrows connecting the vertical dashed lines in FIG. 2 indicate directions in which information travels.

The procedure of download printing is started when an instruction for download printing is received by the MFP 100. The instruction for download printing is, for example, inputted by the user by using the operation panel 40. Note that the MFP 100 is also capable of receiving the instruction for download printing through the network interface 37 or the USB interface 38.

The user wishing to perform download printing from the image storage server 300, first, uses the operation panel 40 or the like to input, in the MFP 100, login information for logging in to the image storage server 300. For example, a combination of a user ID and a password is used as the login information. The MFP 100 transmits the inputted login information to the image storage server 300. If the image storage server 300 permits the login, the user can use the image storage server 300 through the MFP 100.

Next, the MFP 100 makes a request to the image storage server 300 for a file list that can be downloaded by the user identified by the login information. The file list is a list of flies that can be downloaded by the user, the files being identified by filenames, thumbnails, and so on. The file list is provided by the image storage server 300. Further, the MFP 100 displays, on the operation panel 40, tabulated downloadable files based on the file list returned from the image storage server 300. By referring to this display, the user selects a file for which download printing is to be performed. After the file is selected, the MFP 100 determines a downloading mode of the file selected by the user, based on a predetermined condition. The method of determining the downloading mode will be described later.

Note that the user can select a plurality of files from the tabulated file list. If a plurality of files is selected, the MFP 100 determines the downloading mode for each job. Here, one selected file corresponds to one job. Further, there are such files stored in the image storage server 300 that one file includes a plurality of print pages or a plurality of image data. This type of file is treated as one job.

The MFP 100 executes downloading and printing of image data based on the determined downloading mode. At this time, as shown by "alt" complex fragment in FIG. 2, the MFP 100 executes either one of "printing by page-by-page downloading mode" process or "printing by job-by-job downloading mode" process. That is, the MFP 100 of the present embodiment has a page-by-page downloading mode and a job-by-job downloading mode, as the downloading mode, and determines either one of the modes for each job.

The "printing by page-by-page downloading mode" process is a process of downloading image data of one page and starting printing when the image data is stored in the RAM 33. That is, the unit of processing (unit of data) in the page-by-page downloading mode is image data of one page. Here, the unit of processing is an amount of data received before the image forming device 10 starts a printing operation. On the other hand, the "printing by job-by-job downloading mode" process is a process of downloading image data of all the pages of one print job and storing the image data in the RAM 33, and then starting printing. That is, the unit of processing in the job-by-job downloading mode is image data of one job.

In case of a job including image data of two pages or more, the unit of processing of the job-by-job downloading mode is larger than the unit of processing of the page-by-page downloading mode. In this case, the page-by-page downloading mode is an example of a first processing mode, and the job-by-job downloading mode is an example of a second processing mode. The printing procedure in each mode will be described later.

When printing of all the selected files is finished and an ending instruction is received from the user, the MFP 100 transmits a logoff instruction to the image storage server 300. Then, the sequence of FIG. 2 including download printing is completed. Note that, after printing of the instructed download printing is finished, the user can perform download printing of another file. In that case, the procedure of selecting a file and thereafter can be repeated, while keeping a login state.

That is, the MFP 100 of the present embodiment has a plurality of modes as the downloading mode, and selects and executes one of the plurality of modes based on the predetermined condition. The plurality of downloading modes of the MFP 100 has different units of processing of data that is downloaded before printing is started. After image data of the unit of processing set for each downloading mode is stored in the RAM 33, the CPU 31 of the MFP 100 controls the image forming device 10 to start a printing operation for image data of that unit of processing.

Figure 3:
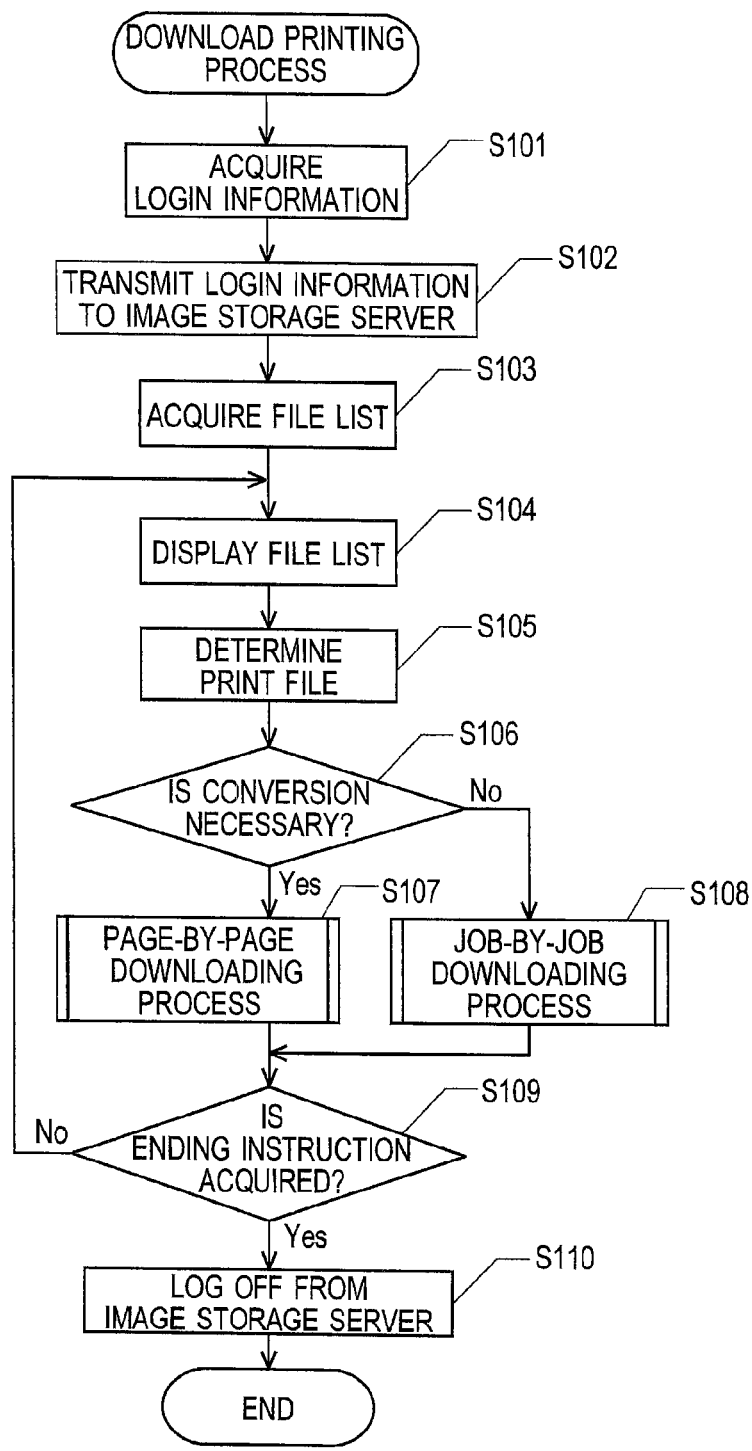
FIG. 3 is a flowchart showing the procedure of a download printing process.

Next, the procedure of a download printing process executed by the MFP 100 for realizing the above-described download printing will be described while referring to the flowchart of FIG. 3. The download printing process is executed by the CPU 31, triggered by reception of an instruction for download printing.

Upon starting execution of the download printing process, the CPU 31 first controls the operation panel 40 to display a screen prompting an input of login information, and acquires the login information for logging in to the image storage server 300 based on the input of the user (S 101). Upon acquiring the login information, the CPU 31 transmits the acquired login information to the image storage server 300 (S102). If login is successful, the MFP 100 is allowed to use services of the image storage server 300.

If the login to the image storage server 300 is successful, the MFP 100 acquires file list information from the image storage server 300 (S103). For example, if the login user preliminarily prepares a list of downloadable files on the image storage server 300, the MFP 100 acquires the file list information from the image storage server 300. Or, the CPU 31 may control the operation panel 40 to display a site (location) or the like on the image storage server 300, and may acquire a list of image data included in the site.

Subsequent to S103, the CPU 31 controls the operation panel 40 or the like to display the acquired file list (S104). Further, the MFP 100 receives a print instruction of a file selected from the acquired file list. For example, the user selects a file to be printed from the displayed file list, and operates a print button. The MFP 100 determines that the file for which the print instruction has been received is a print file which is a file to be printed (S105).

The file list acquired in S103 also contains property information of each file. The property of a file includes a file format and a data size, for example. That is, the MFP 100 can acquire file format information of the print file determined in S105. And, based on the file format of the print file determined in S105, the CPU 31 determines whether the print file is a file that requires a conversion process by the conversion server 200 (S106).

Note that the file format of a print file can be acquired based on an extension of the print file, for example. A file including image data of a file format that cannot be analyzed by the MFP 100 requires the conversion process by the conversion server 200. Whether a file format is analyzable can be determined, for example, by preliminarily storing extensions of analyzable files and by determining whether the stored extensions include the extension of the print file.

If the CPU 31 determines that the print file is a file that requires a conversion process by the conversion server 200 (S106: Yes), the CPU 31 selects the page-by-page downloading mode and executes the page-by-page downloading process (S107).

On the other hand, if the print file is a file of a file format that can be analyzed by the MFP 100 and hence the CPU 31 determines that the print file does not require a conversion process by the conversion server 200 (S106: No), the CPU 31 selects the job-by-job downloading mode and executes the job-by-job downloading process (S108).

Figure 4:
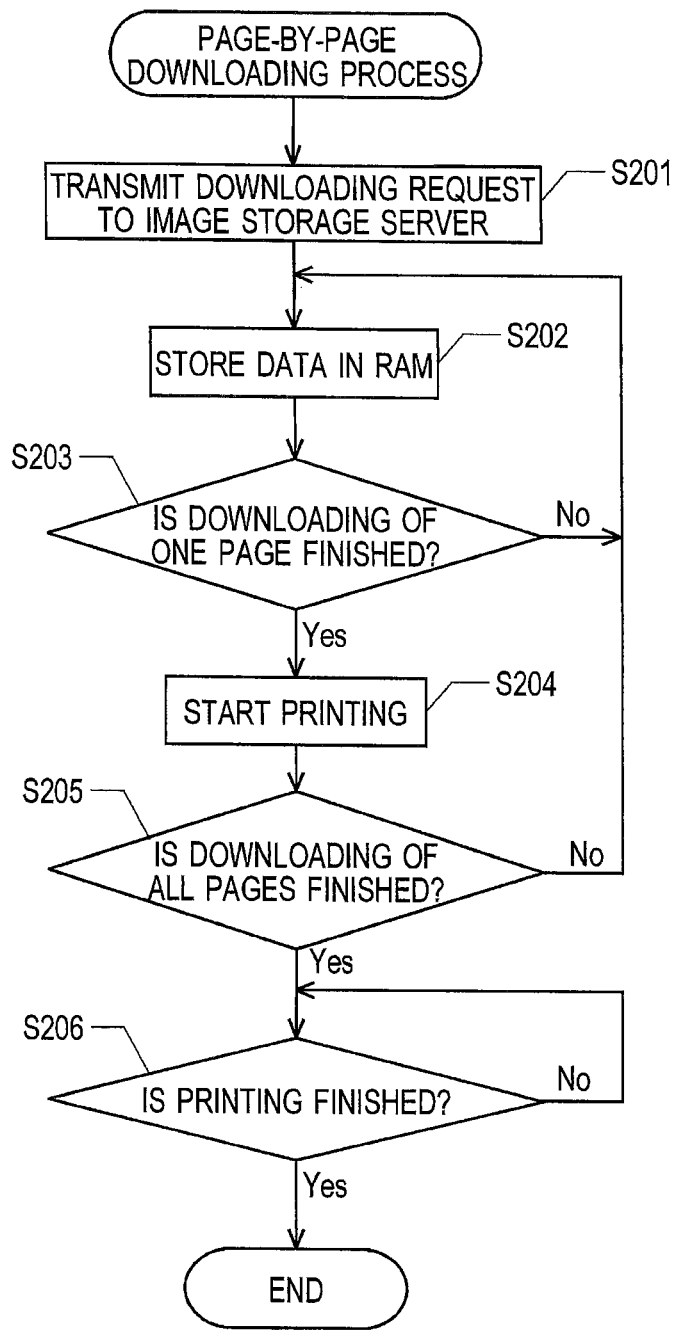
FIG. 4 is a flowchart showing the procedure of a page-by-page downloading process.

Here, the procedure of the page-by-page downloading process in S107 will be described while referring to the flowchart of FIG. 4. In this process, it is already determined in S106 that the conversion process by the conversion server 200 is required. Hence, in the page-by-page downloading process, the MFP 100 downloads image data stored in the image storage server 300 by way of the conversion server 200, as converted image data (image data for which the conversion process has been performed).

Upon starting execution of the page-by-page downloading process, the MFP 100 transmits, to the image storage server 300, a signal requesting start of downloading (S201). Information "not convertible" is attached to the signal transmitted in S201. Hence, the image storage server 300 transmits image data to the conversion server 200. A conversion request and destination information of image data subsequent to conversion are attached to this image data. The conversion server 200 converts the image data based on information downloaded from the image storage server 300, and transmits image data subsequent to conversion to the MFP 100. The MFP 100 sequentially stores, in the RAM 33, image data downloaded by way of the conversion server 200 (S202).

Then, the CPU 31 determines whether downloading of image data of one page is finished (S203). The image data converted by the conversion server 200 can be analyzed by the MFP 100. Hence, the CPU 31 analyzes image data subsequent to conversion to make a determination of S203. For example, if a header includes information relating to a page break, a page break can be obtained based on the information. Or, if information indicative of a page break is obtained as a result of sequentially analyzing image data, the CPU 31 determines that a page break exists in that position.

That is, even if downloading is performed only to a middle of a job, the CPU 31 of the MFP 100 can determine whether there is a page break in downloaded image data. Hence, if image data of one page is not stored in the RAM 33, that is, if downloading of image data does not reach a page break yet (S203: No), downloading is further continued (S202).

If it is determined that downloading of image data of one page is finished (S203: Yes), the CPU 31 controls the image forming device 10 to start printing of the page for which downloading is finished (S204). Because the image forming device 10 is a page printer, the image forming device 10 is capable of performing printing on a page-by-page basis. Note that the MFP 100 may delete, from the RAM 33, image data of the page for which downloading is finished. Or, the MFP 100 may keep such image data in the RAM 33.

Then, the CPU 31 determines whether downloading of all the pages is finished (S205). If downloading of all the pages is not finished (S205: No), the CPU 31 downloads image data of next page (S202). The MFP 100 executes downloading of image data in parallel with a printing operation of the image forming device 10. And, if printing of the previous page is finished and downloading of image data of the next page is finished, the MFP 100 starts printing of the next page.

If downloading of all the pages of a job is finished (S205: Yes), the CPU 31 determines whether printing of all the pages is finished (S206). If it is determined that printing of all the pages is not finished (S206: No), the CPU 31 waits until printing of all the pages is finished. If it is determined that printing of all the pages is finished (S206: Yes), the CPU 31 ends the page-by-page downloading process.

Figure 5:
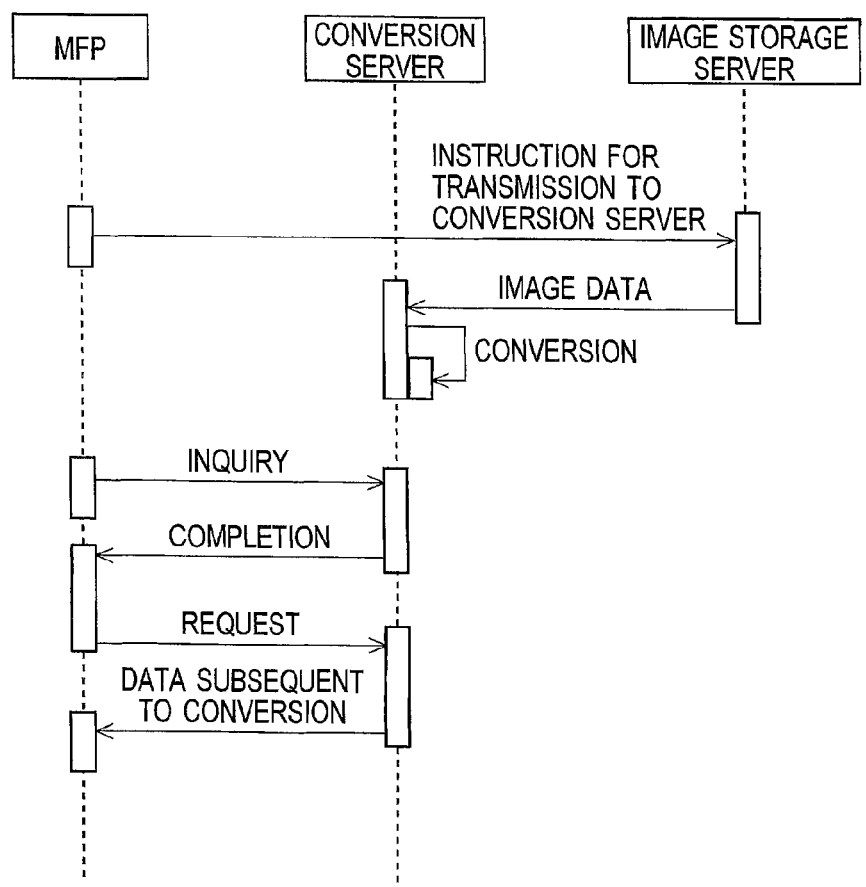
FIG. 5 is a sequence chart showing the procedure of conversion and reception of image data.

Note that, in S201 of the page-by-page downloading process, the following procedure may be used instead of the above-described procedure. For example, as shown in FIG. 5, the MFP 100 instructs the image storage server 300 to transmit, to the conversion server 200, data of a file for which a print instruction has been received, and the image storage server 300 transmits the image data to the conversion server 200. Here, the instruction to the image storage server 300 includes an instruction of a conversion process by the conversion server 200. Then, the conversion server 200 converts received image data and generates image data subsequent to conversion.

The MFP 100 makes an inquiry to the conversion server 200 about whether generation of image data subsequent to conversion is completed. For example, the MFP 100 may repeat making inquiries until a reply of completion is obtained, or may make another inquiry after a suitable time elapses. And, if a reply that conversion is completed is obtained, the MFP 100 requests the conversion server 200 to transmit image data subsequent to conversion, and receives the image data subsequent to conversion.

Figure 6:
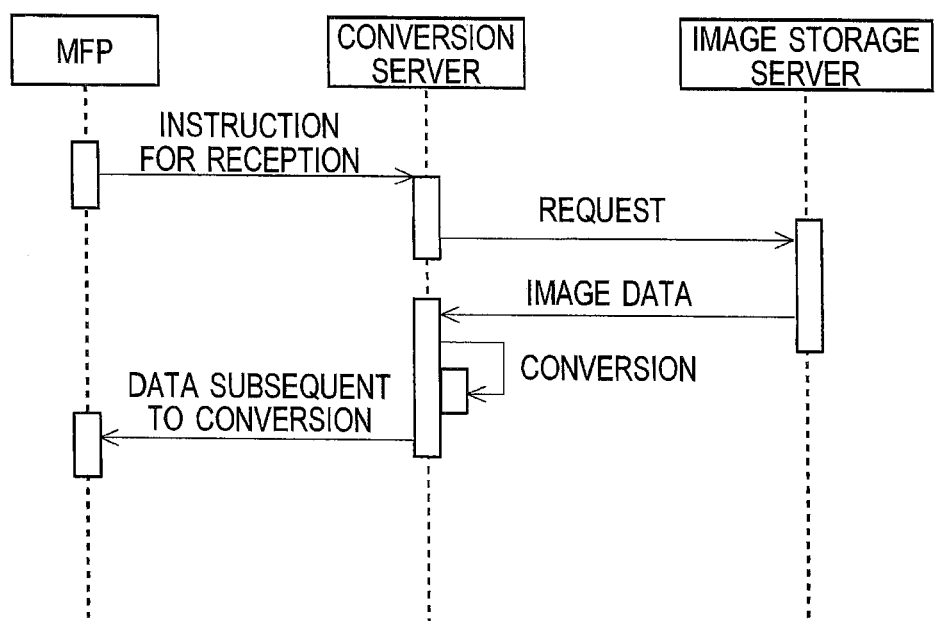
FIG. 6 is a sequence chart showing the procedure of conversion and reception of image data.

Or, as shown in FIG. 6, the MFP 100 may instruct the conversion server 200 to receive image data. That is, the MFP 100 instructs the conversion server 200 to execute a series of steps including a step of receiving, from the image storage server 300, image data of a file for which a print instruction has been received, a step of converting the received image data, and a step of transmitting generated image data subsequent to conversion to the MFP 100. Upon receiving this instruction, the conversion server 200 makes a request to the image storage server 300 for image data. Further, the conversion server 200 receives image data from the image storage server 300, converts the received image data, and transmits image data subsequent to conversion to the MFP 100.

The MFP 100 receives image data subsequent to conversion (converted image data), based on a transmission signal (a preliminary signal informing that data will be transmitted) from the conversion server 200. Note that it is not always necessary that an instruction to the conversion server 200 include the step of transmitting image data subsequent to conversion to the MFP 100. In a case where the instruction does not include such step, the MFP 100 may make an inquiry to the conversion server 200 and request for transmission.

If a print instruction of a plurality of image data (a plurality of files) has been received, there is a possibility that image data requiring a conversion process by the conversion server 200 and image data not requiring the conversion process are mixed. In this case, there is a possibility that the sequence of image data in a print instruction differs from the sequence of received image data. In order to suppress confusion, it is preferable to add, to image data subsequent to conversion, information for associating image data in an original print instruction with the image data subsequent to conversion. For example, it is preferable to insert a file name and a page break of image data prior to conversion to a header of image data subsequent to conversion. In this way, at the time of receiving image data subsequent to conversion, the CPU 31 of the MFP 100 can determine whether to execute the page-by-page downloading or to execute the job-by-job downloading, based on information of image data prior to conversion.

Figure 7:
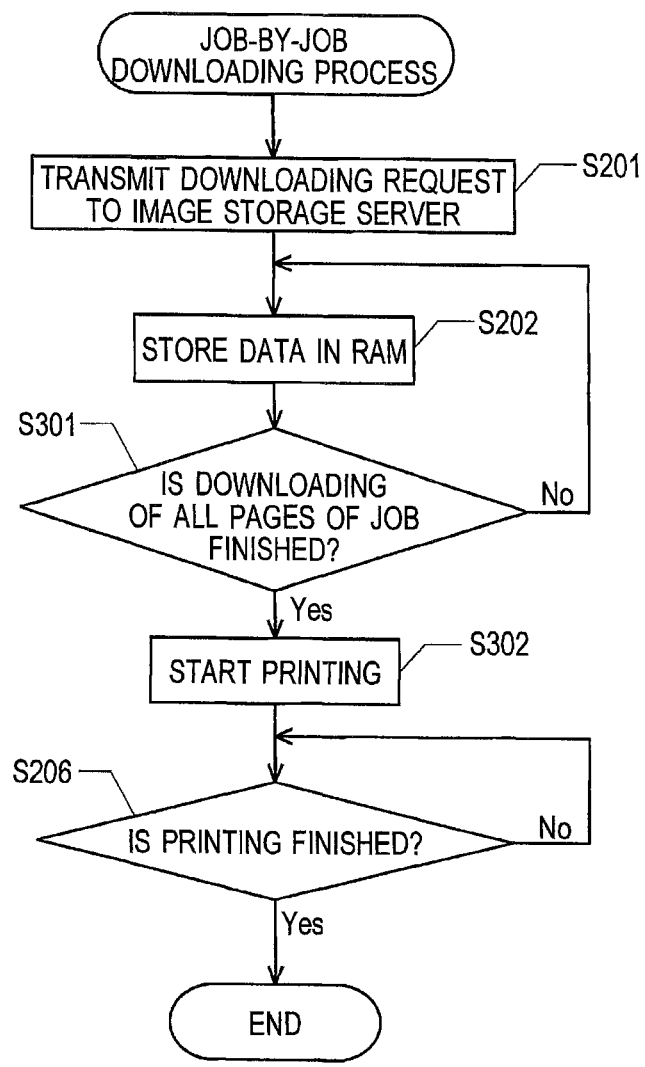
FIG. 7 is a flowchart showing the procedure of a job-by-job downloading process.

Next, the procedure of the job-by-job downloading process in S108 will be described while referring to the flowchart of FIG. 7. The job-by-job downloading process is executed when it is determined in S106 that image data does not require conversion by the conversion server 200. In the job-by-job downloading process, the timing of starting printing is different from that of the page-by-page downloading process. The same parts and steps as those of the page-by-page downloading process are designated by the same reference numerals to avoid duplicating description.

Upon starting execution of the job-by-job downloading process, the CPU 31 of the MFP 100 makes a request to the image storage server 300 for downloading data (S201), and stores the downloaded data in the RAM 33 (S202). In the job-by-job downloading mode, it is already determined in S106 that no conversion process by the conversion server 200 is required. Hence, the MFP 100 downloads image data directly from the image storage server 300, not by way of the conversion server 200. Subsequent to S202, the CPU 31 determines whether downloading of all the pages of a job is finished (S301). If downloading of all the pages of the job is not finished (S301: No), the CPU 31 further executes downloading of data and storing of the data in the RAM 33 (S202).

If it is determined that downloading of all the pages of the job is finished (S301: Yes), the CPU 31 controls the image forming device 10 to start printing (S302). That is, downloading is continued until downloading of all the pages of the job is finished. If downloading of all the pages of the job is not finished, a printing operation is not started. Then, the CPU 31 determines whether printing of all the pages is finished (S206). If it is determined that printing of all the pages is not finished (S206: No), printing is executed until printing of all the pages is finished. If it is determined that printing of all the pages is finished (S206: Yes), the job-by-job downloading process ends.

Returning to FIG. 3, when the page-by-page downloading process in S107 or the job-by-job downloading process in S108 is finished, the CPU 31 determines whether an ending instruction by the user is acquired (S109). If the ending instruction is not acquired (S109: No), the file list is displayed and execution of download printing is continued (S104 to S108).

On the other hand, if an instruction for ending download printing is received from the operation panel 40 or the like (S109: Yes), the MFP 100 sends a logoff instruction to the image storage server 300 (S110). With this step, the MFP 100 finishes usage of a service provided by the image storage server 300. Then, the download printing process ends.

In the present embodiment, the MFP 100 acquires the file format of a file selected by the user, and selects one of the page-by-page downloading mode and the job-by-job downloading mode depending on whether the data includes image data that requires a conversion process by the conversion server 200. The file list acquired in S103 includes information of a file size. Accordingly, with respect to a file including image data that does not require a conversion process by the conversion server 200, the MFP 100 can estimate the size of image data based on the file size. On the other hand, with respect to a file including image data that requires a conversion process by the conversion server 200, the MFP 100 cannot preliminarily grasp the size of image data subsequent to conversion.

In the present embodiment, image data requiring conversion by the conversion server 200 is downloaded by the page-by-page downloading mode. Hence, even if downloading of all the pages is not finished, printing is started on a page-by-page basis. And, once printing of one page is finished, image data of the finished page is deleted. Accordingly, even if the size of image data in an entire job is large, overflow of the RAM 33 is unlikely to occur due to the image data.

Further, in the page-by-page downloading process, printing is started before downloading of data of all the selected pages is finished. Accordingly, it is expected to reduce time prior to acquisition of a print output of the first sheet.

On the other hand, in the job-by-job downloading process, first, image data of all the selected pages is downloaded, and subsequently a printing process is started. Accordingly, at the time of starting the printing process, image data of the entire job is complete. Accordingly, it is unlikely that a printing operation becomes intermittent during printing, due to waiting time for downloading or the like. Further, it is expected that the total time of a printing process itself from starting of a printing process until ending of printing of all the pages, that is, an occupancy time of the image forming device 10 is shorter than that of the page-by-page downloading mode since there is no waiting time for downloading.

Next, an example of other selection conditions that can be used as a selecting condition of the downloading mode will be described. The MFP 100 may have only one condition that is preliminarily selected from among these conditions. Or, the MFP 100 may have a plurality of conditions, and may apply one condition that is selected based on settings performed by an administrator, a state of the MFP 100, or the like.

The above-described the MFP 100 acquires, as a characteristic, a property of image data including the file format of the image data, and selects (switches) the downloading mode based on the acquired file format. Specifically, the procedure has been described in which the downloading mode is selected based on whether the file format requires a conversion process by the conversion server 200. As another example of a file format, the downloading mode may be selected based on whether the file format is such that the MFP 100 can obtain a page break before image data of all the page of a job is downloaded, for example. Examples of file formats in which a page break can be obtained are PDL files such as PostScript and PCL.

If a file has a file format in which a page break can be obtained, the MFP 100 can determine that downloading of image data of one page is finished, even in the middle of downloading of a job. Hence, at this stage, a printing process of one page can be started based on image data stored in RAM 33. Accordingly, by selecting the page-by-page downloading mode, the first sheet can be outputted quickly, which is preferable. On the other hand, if a file has a file format in which a page break cannot be obtained in the middle of a job, a printing process in the job-by-job downloading mode is preferable.

Further, the downloading mode may be selected based on another property of image data, a print setting at the time of printing image data, or the state of the MFP 100. For example, the downloading mode may be selected based on a data size. Specifically, if the size of a selected print file is larger than a predetermined size, the page-by-page downloading mode is selected. If a print file of a large size is downloaded and printed in the job-by-job downloading mode, a memory overflow may occur. If the size of image data is not larger than a predetermined size, the job-by-job downloading mode may be selected without difficulty.

Further, the downloading mode may be selected based on whether the print setting of image data is duplex printing (both-side printing). In duplex printing, the MFP 100 performs printing of a first side of a sheet, and subsequently performs printing of a second side. In such MFP 100, it is preferable to start printing after image data of the first side and image data of the second side are complete. Accordingly, in a case where duplex printing is set, it is preferable to select the job-by-job downloading mode. On the other hand, in a case where single-side printing is set, the page-by-page downloading mode may be selected.

Further, the downloading mode may be selected based on whether the print setting of image data is at least one of color printing and multiple-copy printing. It is presumed that image data for color printing has a large data size. It is also presumed that multiple-copy printing takes a longer time than single-copy printing. Accordingly, if color printing or multiple-copy printing is selected, it is preferable to select the page-by-page downloading mode. On the other hand, in monochromatic printing or single-copy printing, the job-by-job downloading mode may be printed.

Further, the downloading mode may be selected based on a state of the MFP 100. For example, a free area of the RAM 33 of the MFP 100 is acquired and, if the free area is smaller than a predetermined amount, the page-by-page downloading mode is selected. The amount of data downloaded at a time in the page-by-page downloading mode is smaller than that in the job-by-job downloading mode, and hence a memory overflow is less likely to occur. On the other hand, if there is a sufficient free area in the RAM 33, the job-by-job downloading mode may be selected.

Further, for example, the downloading mode may be selected based on whether a power saving mode is set in the MFP 100. In the job-by-job downloading mode, printing is started after image data of all the pages of a job is complete. Hence, it is not necessary to wait for downloading of image data after printing is started. That is, it is expected that a total time required for printing in the job-by-job downloading mode is shorter than that of the page-by-page downloading mode. Accordingly, it is expected that electric energy required for a printing operation in the job-by-job downloading mode is less than that of the page-by-page downloading mode. Accordingly, if the power saving mode is set, it is preferable to select the job-by-job downloading mode.

Further, for example, in a case where a plurality of files is selected in an instruction for download printing, the downloading mode may be selected based on whether a subsequent file (in other words, a print file that is printed subsequent to the above-mentioned plurality of files) exists. In this case, for example, the unit of processing in a first processing mode is one file, and the unit of processing in a second processing mode is all the files for which a print instruction has been received. If printing is started after all of the plurality of files is downloaded and if there is a subsequent file, it is likely that a memory overflow occurs. Hence, if a subsequent file exists, the first processing mode is selected in which image data is downloaded and printed one file at a time (on a file-by-file basis). On the other hand, if no subsequent file exists, image data of all the files for which a print instruction has been received is downloaded and then printed (the second processing mode). Here, whether a subsequent file exists is an example of the state of the MFP 100.

As described above in detail, the MFP 100 of the present embodiment downloads image data stored in the image storage server 300 upon receiving an instruction for download printing, and controls the image forming device 10 to perform printing based on the downloaded image data. At this time, the MFP 100 acquires at least one of a property of image data, a print setting of image data, and a state of the MFP 100 itself. And, based on the acquisition result, the MFP 100 selects one of a plurality of downloading modes having different units of processing. Accordingly, the downloading mode suitable for the property of image data or the like can be selected.

For example, in the page-by-page downloading mode in which the unit of processing is image data of one page, printing is started each time downloading of image data of one page is finished. Accordingly, it is expected that the first sheet is outputted more quickly. Further, in the job-by-job downloading mode in which the unit of processing is image data of one job, printing is started after image data of one job is downloaded. Accordingly, it is expected to shorten a total time required for printing.

While the invention has been described in detail with reference to the above aspects thereof, it would be apparent to those skilled in the art that various changes and modifications may be made therein without departing from the scope of the claims.

For example, in addition to the MFP, the invention can be applied to an apparatus having a communication function and an image forming function, such as a copier and a facsimile apparatus.

Further, in the above-described embodiment, if an instruction for printing a file requiring a conversion process is received, the MFP 100 downloads a file that has been converted by the conversion server 200. However, for example, if the image storage server 300 has a conversion function, that conversion function may be used. Or, after the MFP 100 downloads a file from the image storage server 300, the MFP 100 may transmit the file to the conversion server 200 for performing a conversion process. Or, the image storage server 300 may transmit a file to the conversion server 200 for performing a conversion process, the conversion server 200 may return the converted file to the image storage server 300, and the MFP 100 may download the converted file from the image storage server 300.

Further, in the above-described embodiment, the MFP 100 that is an electro-photographic-type page printer is illustrated. However, the invention can be applied to an inkjet-type printing apparatus. In that case, the downloading modes may include a block-by-block downloading mode in addition to the above-described two downloading modes. The block-by-block downloading mode is a mode of starting printing when image data of one block is downloaded and stored in the RAM 33. The image data of one block is an amount of image data smaller than one page, that is, for example, several lines. This is because the inkjet-type printing apparatus is capable of performing printing by a unit smaller than one page. Or, the unit of processing of image data to be downloaded may be 1.5 pages or 2 pages, for example, as well as one page, one job, and one block.

For example, if the user is already logged in to the image storage server 300 when an instruction for starting the download printing process is received, the both steps S101 and S102 may be skipped. Further, if download printing does not require login, the login step is unnecessary. That is, in the download printing process, the steps S101 and S102 are unnecessary. Further, for example, for a user who is allowed to log in to the MFP 100, login information to the image storage server 300 may be stored in the NVRAM 34. And, if the user who has logged in to the MFP 100 gives an instruction for downloading data from the image storage server 300, the MFP 100 may read out the stored login information and log in to the image storage server 300.

The processes disclosed in the embodiment may be executed by hardware such as a single CPU, a plurality of CPUs, an ASIC etc., or a combination thereof. Further, the processes disclosed in the embodiment may be realized in various modes such as a storage medium storing program instructions for executing the processes, a method of executing the processes, and the like.

What is claimed is:

1. A printing apparatus comprising:
an interface;
a printing device configured to perform printing based on image data;
a processor; and
a memory storing instructions, the instructions, when executed by the processor, causing the processor to perform:
receiving a print instruction via the interface, the print instruction including a designation of particular image data stored in a server;
in response to reception of the print instruction, acquiring a property of the particular image data, the property including a file format of the particular image data;
based on the property determining one of a first processing mode and a second processing mode, the determining comprising determining the first processing mode in response to determination that the file format included in the property is a file format that allows the processor to detect a page break prior to determining completion of reception of whole contents of the image data;

when the first processing mode is determined,
receiving the particular image data until reaching a first unit of data; the first unit of data being one page; and
controlling the printing device to print the particular image data of the first unit; and when the second processing mode is determined,
receiving the particular image data until reaching a second unit of data; and
controlling the printing device to print the particular image data of the second unit, the second unit of data being larger than the first unit of data.

2. The printing apparatus according to claim 1, wherein, when executed by the processor, the instructions further cause the processor to perform:
determining the first processing mode in response to determination that the file format included in the property is a file format requiring a conversion process by an external device.

3. The printing apparatus according to claim 2, wherein, when executed by the processor, the instructions further cause the processor to perform:
transmitting, to the server, an instruction of transmitting the image data to the external device; and
receiving converted image data from the external device, the converted image data being generated by the conversion process of the image data transmitted to the external device based on the instruction.

4. The printing apparatus according to claim 2, wherein, when executed by the processor, the instructions further cause the processor to perform:
instructing the external device to acquire the image data from the server and to execute the conversion process of the image data; and
receiving converted image data from the external device, the converted image data being generated by the conversion process.

5. The printing apparatus according to claim 1, wherein, when executed by the processor, the instructions further cause the processor to perform:
acquiring the property including a data size of the particular image data; and
determining the first processing mode in response to determination that the data size included in the property is larger than a predetermined size.

6. The printing apparatus according to claim 1, wherein, when executed by the processor, the instructions further cause the processor to perform:
acquiring a print setting of the articular image data, the print setting including a duplex printing setting; and
determining the second processing mode in response to determination that the print setting includes the duplex printing setting indicating that duplex printing is to be performed.

7. The printing apparatus according to claim 1, wherein, when executed by the processor, the instructions further cause the processor to perform:
acquiring a print setting of the particular image data, the print setting including at least one of a color printing setting and a multiple-copy printing setting; and
determining the first processing mode in response to determination that the print setting includes at least one of: the color printing setting indicating that color printing is to be performed; and the multiple-copy printing setting indicating that multiple-copy printing is to be performed.

8. The printing apparatus according to claim 1, further comprising a storage device configured to store image data,
wherein, when executed by the processor, the instructions further cause the processor to perform:
acquiring a state of the printing apparatus, the state including a free area of the storage device; and
determining the first processing mode in response to determination that the free area is smaller than a prescribed amount.

9. The printing apparatus according to claim 1,
wherein, when executed by the processor, the instructions further cause the processor to perform:
acquiring a state of the printing apparatus, the state including information of whether a subsequent job exists; and
determining the first processing mode in response to determination that the state includes information that a subsequent job exists.

10. The printing apparatus according to claim 1, wherein, when executed by the processor, the instructions further cause the processor to process one job as the second unit of data.

11. The printing apparatus according to claim 1, wherein, when executed by the processor, the instructions further cause the processor to perform:
prior to receiving the print instruction, receiving a property of each of one or more image data stored in the server; and
in response to reception of the print instruction, acquiring a property of the image data for which the print instruction is received, out of the property of each of the one or more image data.

12. The printing apparatus according to claim 1, wherein, when executed by the processor, the instructions further cause the processor to perform:
determining the first processing mode in response to determination that the file format included in the property is a file format requiring a conversion process by an external device; and
determining the second processing mode in response to determination that the file format included in the property is a file format not requiring the conversion process by the external device, the second unit of data being one job.

13. The printing apparatus according to claim 1, wherein, when executed by the processor, the instructions further cause the processor to perform:
determining whether a power saving mode is set in the printing apparatus; and
determining the second processing mode in response to determination that the power saving mode is set.

14. A printing apparatus comprising:
an interface;
a printing device configured to perform printing based on image data;
a processor; and
a memory storing instructions, the instructions, when executed by the processor, causing the processor to perform:
receiving a print instruction via the interface, the print instruction including a designation of particular image data stored in a server;
in response to reception of the print instruction, acquiring a print setting of the particular image data, the print setting including at least one of a color printing setting, a multiple-copy printing setting, and a duplex printing setting;

based on the print setting, determining one of a first processing mode and a second processing mode, the determining comprising at least one of:

determining the first processing mode in response to determination that the print setting includes at least one of: the color printing setting indicating that color printing is to be performed; and the multiple-copy printing setting indicating that multiple-copy printing is to be performed; and determining the second processing mode in response to determination that the print setting includes the duplex printing setting indicating that duplex printing is to be performed;

when the first processing mode is determined, receiving the particular image data until reaching a first unit of data; and controlling the printing device to print the particular image data of the first unit; and when the second processing mode is determined, receiving the particular image data until reaching a second unit of data; and controlling the printing device to print the particular image data of the second unit, the second unit of data being larger than the first unit of data.

15. The printing apparatus according to claim 14, wherein, when executed by the processor, the instructions further cause the processor to perform:

acquiring a property of the particular image data, the property including a file format of the particular image data; and determining the first processing mode in response to determination that the file format included in the property is a file format requiring a conversion process by an external device.

16. The printing apparatus according to claim 14, wherein when executed by the processor, the instructions further cause the processor to perform:

acquiring the property including a data size of the particular image data; and determining the first processing mode in response to determination that the data size included in the property is larger than a predetermined size.

17. The printing apparatus according to claim 14, wherein, when executed by the processor, the instructions further cause the processor to perform:

prior to receiving the print instruction, receiving a property of each of one or more image data stored in the server; and in response to reception of the print instruction, acquiring a property of the image data for which the print instruction is received, out of the property of each of the one or more image data.

18. A printing apparatus comprising:

an interface;

a printing device configured to perform printing based on image data;

a processor; and a memory storing instructions, the instructions, when executed by the processor, causing the processor to perform:

receiving a print instruction via the interface, the print instruction including a designation of particular image data stored in a server;

in response to reception of the print instruction, acquiring a state of the printing apparatus, the state including at least one of information of whether a subsequent job exists and information of whether a power saving mode is set in the printing apparatus;

based on the state, determining one of a first processing mode and a second processing mode, the determining comprising at least one of:

determining the first processing mode in response to determination that the state includes information that a subsequent job exists; and determining the second processing mode in response to determination that the power saving mode is set;

when the first processing mode is determined, receiving the particular image data until reaching a first unit of data; and controlling the printing device to print the particular image data of the first unit; and when the second processing mode is determined, receiving the particular image data until reaching a second unit of data; and controlling the printing device to print the particular image data of the second unit, the second unit of data being larger than the first unit of data.

19. The printing apparatus according to claim 18, wherein, when executed by the processor, the instructions further cause the processor to perform:

acquiring a property of the particular image data, the property including a file format of the particular image data; and determining the first processing mode in response to determination that the file format included in the property is a file format requiring a conversion process by an external device.

20. The printing apparatus according to claim 18, wherein, when executed by the processor, the instructions further cause the processor to perform:

prior to receiving the print instruction, receiving a property of each of one or more image data stored in the server; and in response to reception of the print instruction, acquiring a property of the image data for which the print instruction is received, out of the property of each of the one or more image data.

* * * * *